United States Patent Office 3,600,252
Patented Aug. 17, 1971

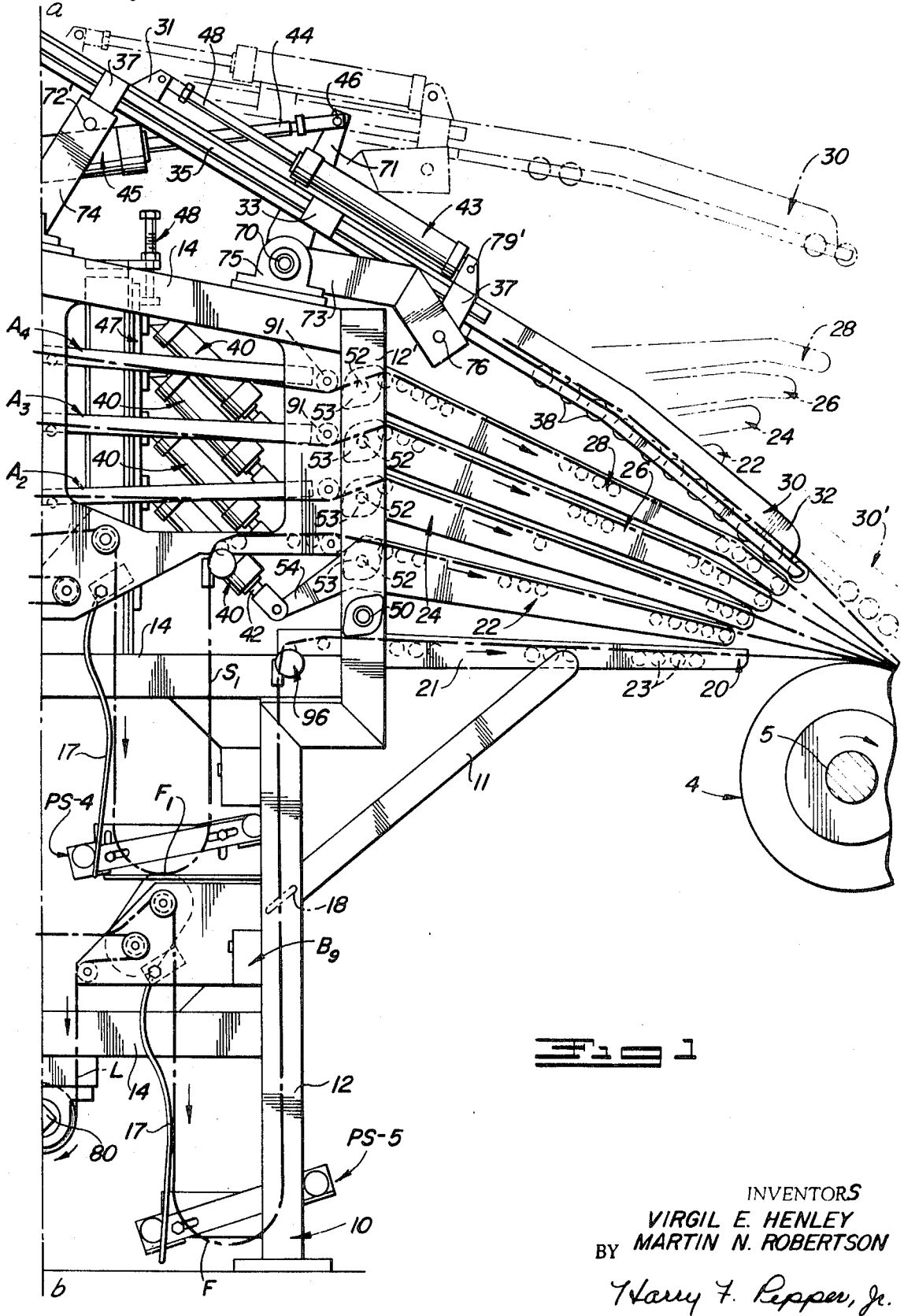

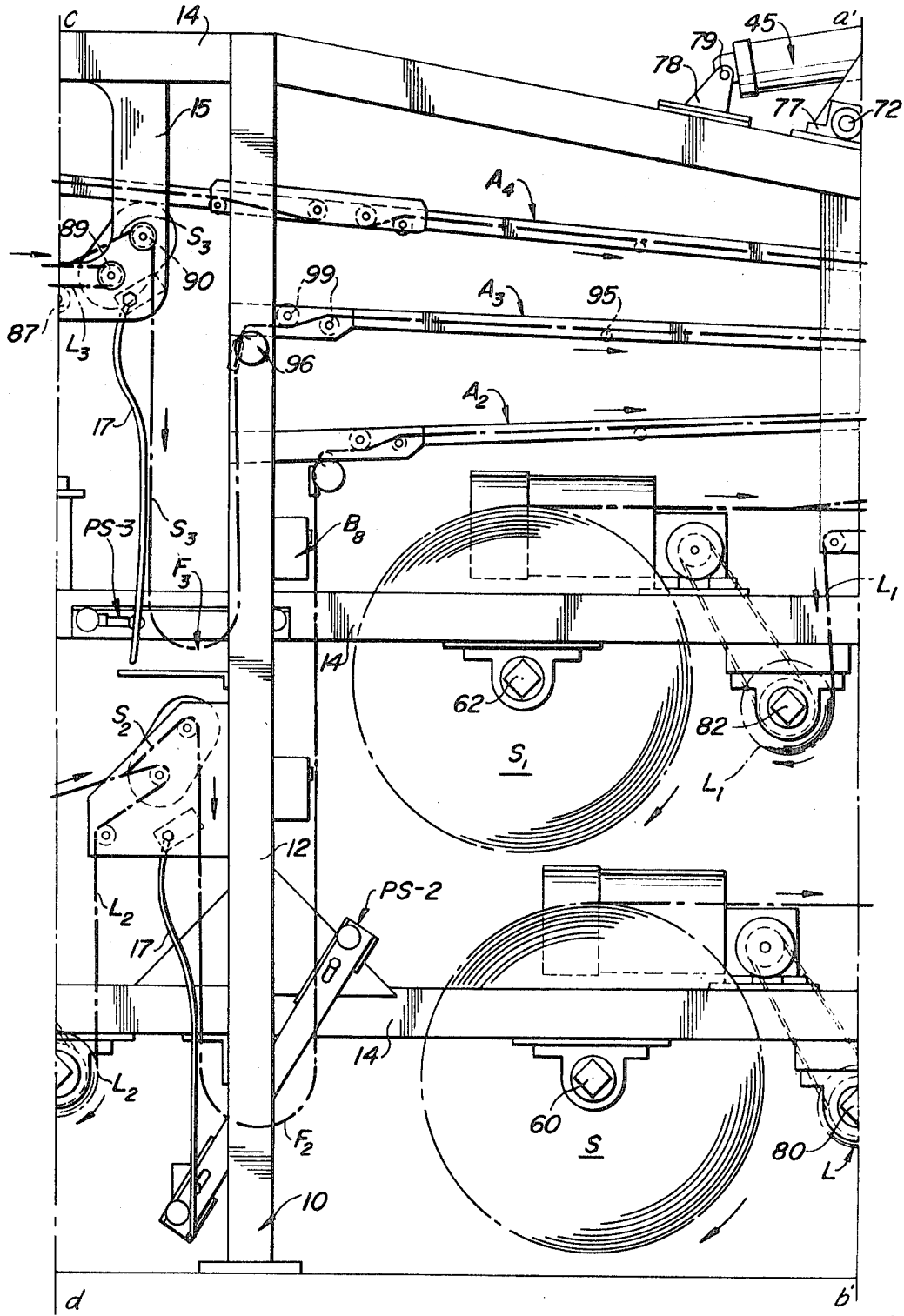

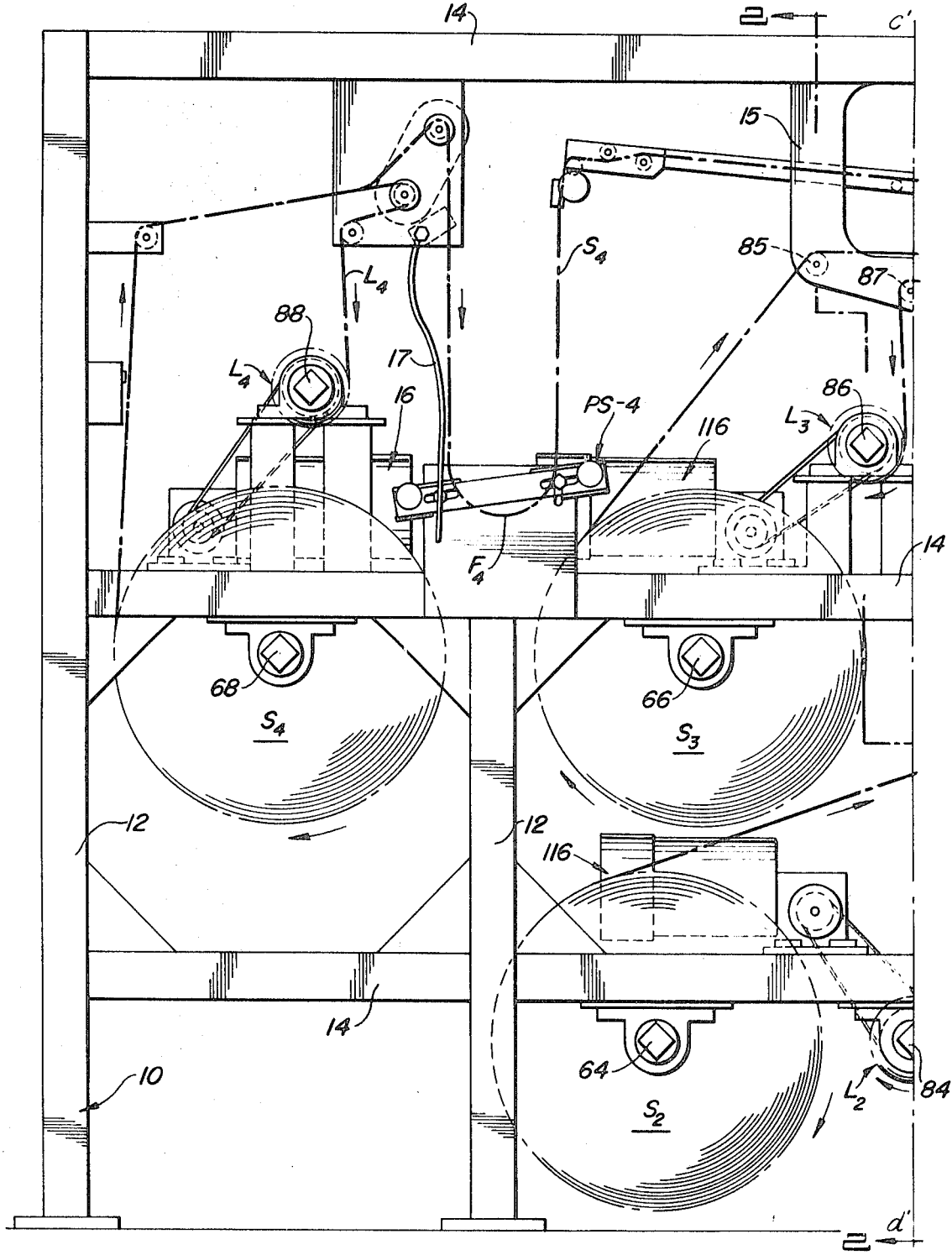

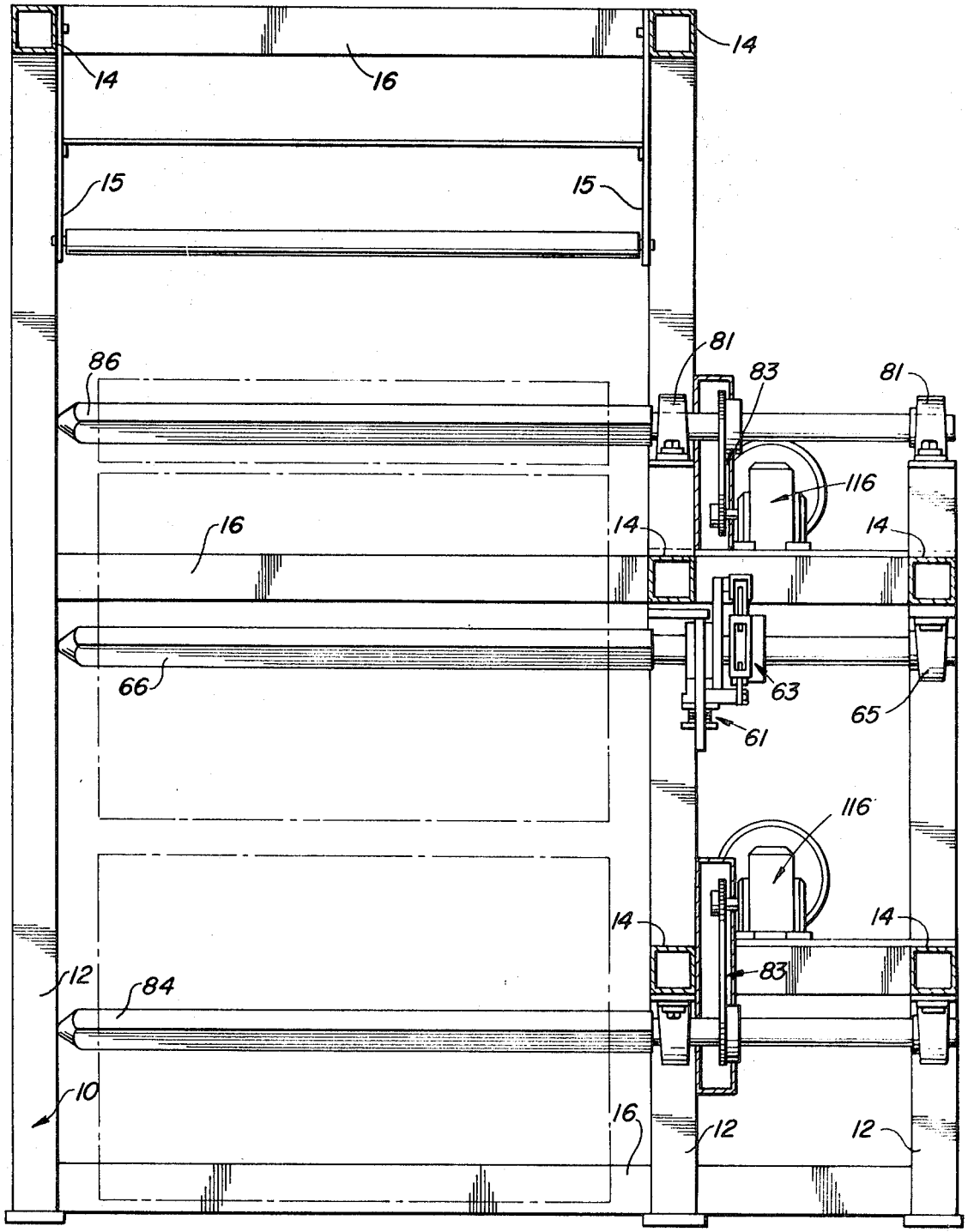

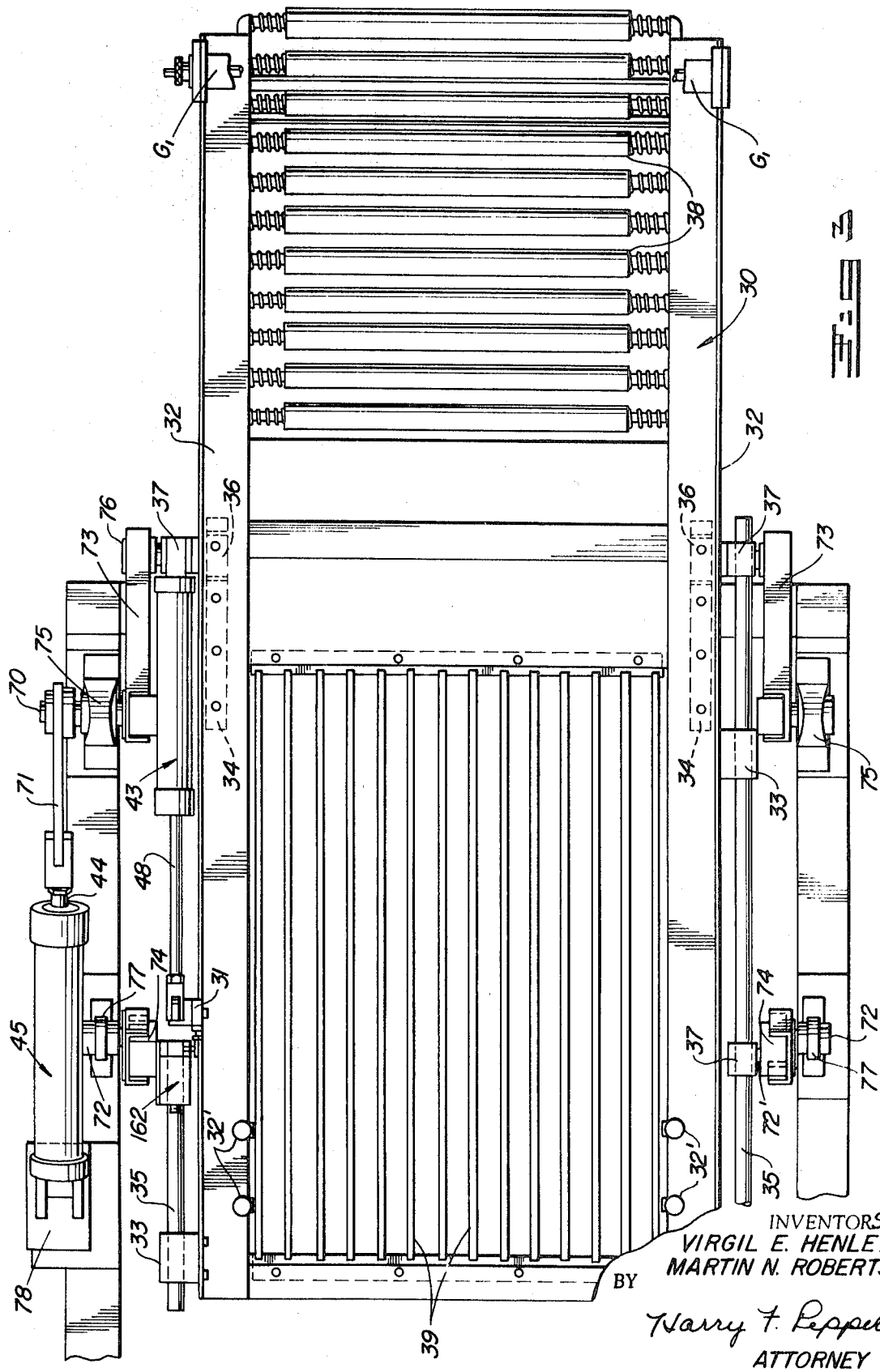

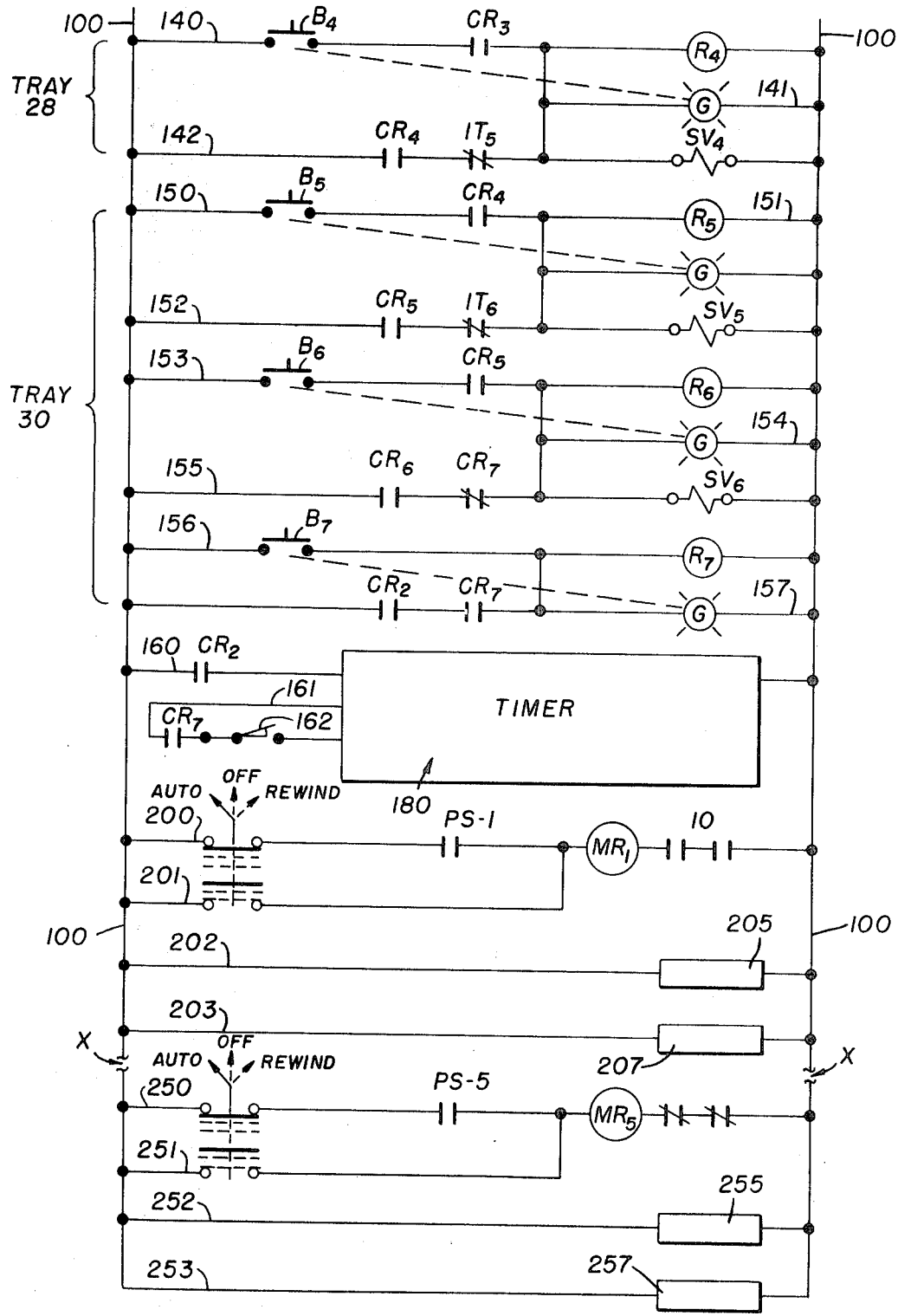

3,600,252
MULTIPLE-STATION SERVICING ASSEMBLY FOR TIRE BUILDING OPERATIONS
Virgil Estill Henley and Martin Nesbitt Robertson, Akron, Ohio, assignors to The General Tire & Rubber Company
Filed Apr. 24, 1969, Ser. No. 818,890
Int. Cl. B29h 17/20
U.S. Cl. 156—406        8 Claims

ABSTRACT OF THE DISCLOSURE

A servicer for a tire building drum, complete with carcass stock supply rolls and guides, is provided with a vertically aligned series of servicing trays at one end of the main frame. A selected number of these trays, which all extend from one end of the servicer, are pivotable into and out of respective servicing positions. The pivotable trays can only be pivoted according to a prescribed building sequence. All but the uppermost tray are operatively associated with stock storage and supply systems also carried by the frame. The top or uppermost tray is adapted to store and ultimately present to the builder the normally extruded piece of elastomeric material, which represents the tread or tread and sidewall portion of the tire, to complete the tire building sequence.

BACKGROUND OF THE INVENTION

The invention relates to a servicer for a tire building drum, and more particularly to a servicer for supplying to the tire builder a plurality of the distinctive uncured tire components which are to be sequentially applied to the drum during the tire building operation.

Because of increasing quantitative demands, tire manufacturers are finding it necessary to constantly innovate tire building operations so as to decrease the time required to build a tire and still maintain or more often improve upon the quality of their product. Fully automated tire building systems have been slow to develop due to the complex structure of a tire and the practically infinite number of building variables resulting from the different sizes, shapes, number and types of plies, etc., demanded by the tire consumer. Therefore, innovations have been directed more toward facilitating the building operation from the tire builder's point of view, rather than toward completely omitting his function.

One such innovation has been the servicer, from which the builder takes the various structural components which are to be placed on the tire building drum. Many different types of servicers are available in the industry, all of which are designed to omit, or substantially reduce the time required for certain steps theretofore required of a tire builder in the performance of his duties.

A servicer basically functions to present to the tire builder at the tire building drum one or more of the distinctive uncured tire components necessary for building the tire. The servicer is positioned adjacent the building drum, which is normally adapted to rotate, and is provided with a take-off point or points, from which the builder withdraws the particular components as they are required according to a prescribed tire building sequence.

While there are many considerations which can contribute to the particular design of a servicer, perhaps the most important general features from the builder's viewpoint are structural simplicity, easy and accurate withdrawal, security against human error, and universality from the standpoint of the number of different tire components it supplies and the variety of tires which can be built.

Most servicers have been designed to aptly reflect one or possibly two of the aforementioned features, but usually at some sacrifice with respect to the others.

For example, servicers are available which are capable of presenting to the builder practically all of the components necessary in a building operation. However, these servicers are usually designed with large, shifting frames or cross-heads which are in turn mounted on a larger main frame. Each shifting cross-head must be monitored or controlled for accuracy during movement. Servicers of this type, while universal in function, can hardly be termed structurally simple. These servicers rather than a single machine would be more accurately described as a combination of a number of complex machines. For a more detailed description of this type of servicers, reference is made to U.S. Pat. No. 3,162,562.

Alternatively, there are more simplified servicers which are also adapted to supply practically all of the tire component stocks to a drum, but which require more of the builder's attention and care. These are basically the turret-type servicers in which a rotating turret is provided with storage rolls of the different uncured stocks, which are connectable through rotation of the turret with a common take-off means. After withdrawing one stock using the singular take-off, the turret rotates a second stock into position and the builder must "thread" the new stock onto the take-off and accurately align the same before pulling the stock from the take-off onto the drum. These steps are repeated for each of the components required. Servicers of this type are somewhat time consuming to operate and are quite dependent upon the skill, attention and care of the builder. For an example of this type of servicers, reference is made to U.S. Pat. No. 3,044,727.

In contrast with the more complex structures noted above, there are the more structurally simplified servicers. These do not provide a great number of moving parts and are desirable from a cost standpoint. However, these are usually limited in the number of different kinds of tire components which they supply. Such a servicer is exemplified by U.S. Pat. No. 3,038,524.

From the foregoing, it can be seen that for a servicer to be both practical and efficient, it should exhibit all of the desirable features stated above rather than just a selected number as has been heretofore provided.

SUMMARY OF THE INVENTION

It is an object of this invention to provide a relatively compact and simply constructed servicer for a tire building drum which is capable of quickly and efficiently supplying practically all the distinct uncured tire components required in a tire building operation.

It is another object to provide a servicer for a tire building drum having a minimum amount of movable parts but which is provided with a maximum amount of safeguards against possible erroneous operation.

It is still another object of the present invention to provide a servicer for a tire building drum constructed so that the tire builder may sequentially withdraw all the essential uncured tire components while standing substantially in one position throughout the entire building sequence.

It is yet another object to provide a servicer which presents the several carcass components to a builder in the sequence in which they are to be placed on the drum, and upon completion of the carcass buildup, presents to the builder the tread or the tread and sidewall portion used to complete the building operation.

The servicer according to the present invention is provided with a plurality of substantially frictionless servicing devices having low friction stock supporting surfaces for support and movement thereover of uncured tire stock components. The servicing devices are mounted at and extend from one end of the main frame of the servicer. The devices are vertically aligned, with the top device adapted to store a tread or tread and sidewall stock placed thereupon by the tire builder prior to the building of each tire. A selected number of the remaining devices are individually pivotable about a horizontal axis. Each device, except the tread stock device, is associated with a separate storage roll for carcass stock carried by the frame. A continuous sheet of carcass sheet is withdrawn from each of these rolls and by means of idler rolls and guides is threaded through the frame and terminates on one of the carcass stock servicing devices. The builder begins by withdrawing the particular stock carried by the lowest of the vertically aligned devices onto the drum, which is rotating. Means are provided on the frame to sequentially pivot the remaining devices into and out of servicing positions according to a particular building sequence.

BRIEF DESCRIPTION OF THE DRAWINGS

The figures in the drawings represent structural details of a preferred embodiment of the invention in which:

FIG. 1 is a side elevation of a portion of the servicing assembly which displays certain details of the servicing or take-off end of the assembly.

FIG. 1a represents a side elevation of another portion of the servicing assembly and specifically shows details of the middle or central portion of the assembly.

FIG. 1b is a side elevation of still another portion of the servicer showing the details of the rear or non-servicing end of assembly.

FIG. 2 is a sectional view of the servicing assembly taken along lines 2—2 of FIG. 1b.

FIG. 3 is a plan view of the tread stock servicing tray with certain parts broken away and omitted.

FIG. 4a is a block diagram completing the circuitry diagram shown in part in FIG. 4.

Figure 4:
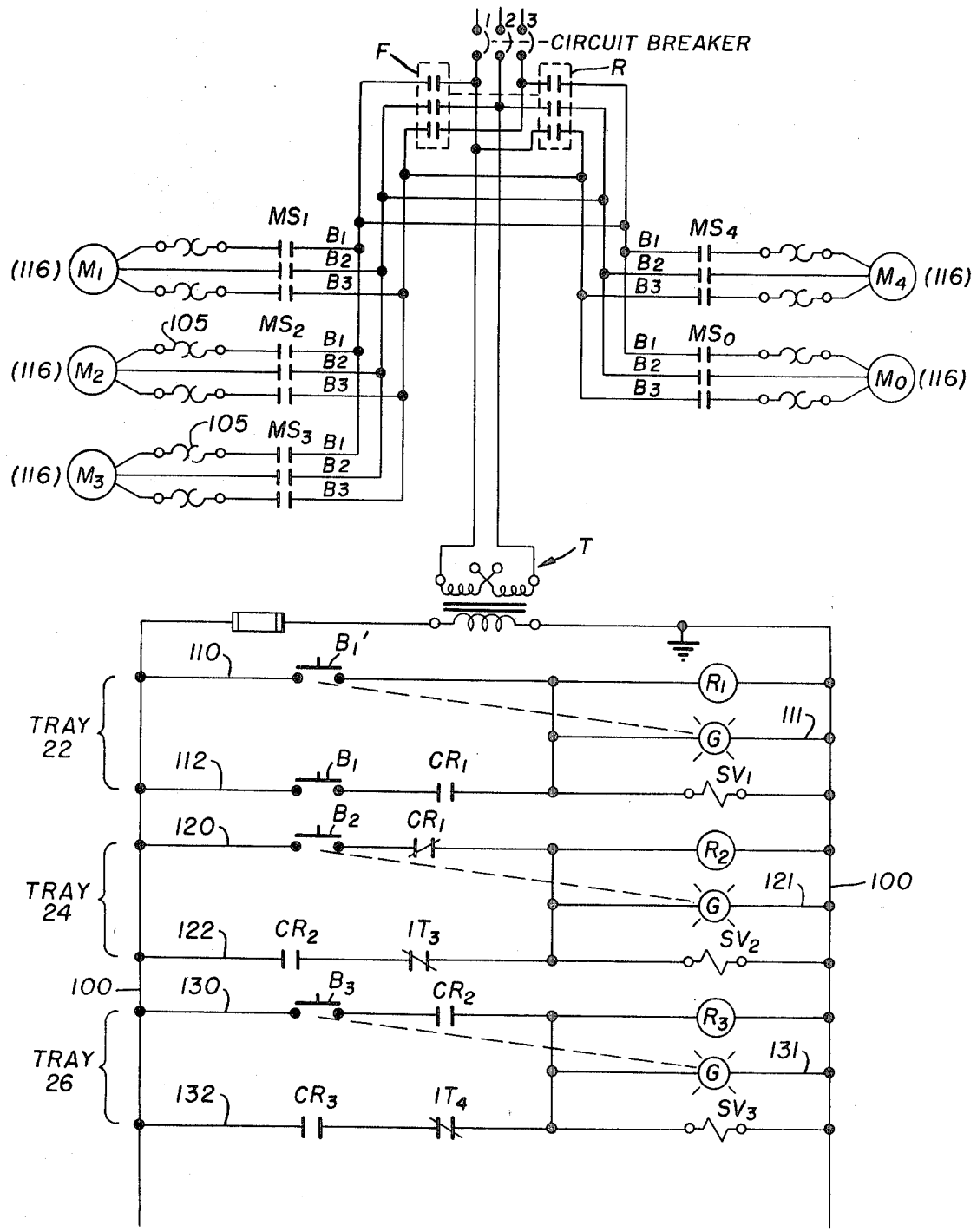
FIG. 4 is a block diagram of a portion of the circuitry used in conjunction with the complete assembly according to the present invention.

DETAILED DESCRIPTION OF A PREFERRED EMBODIMENT (A) General

In the drawings, like reference characters are intended to refer to identical or similar elements throughout the several views.

For the following general description of a preferred embodiment of the invention, attention is directed to FIGS. 1, 1a, 1b and 2 of the drawings.

The servicing assembly includes a frame generally designated as 10, which is composed of several spaced vertical support members 12, connected by longitudinally extending beams 14, as well as transverse beams 16. These components of the frame 10 may be any suitable structural material and cross-section. The particular number and disposition of the members 12 and beams 14 and 16, although not critical, are selected by way of considerations made as to the support requirements of the various elements of the assembly, and the operational efficiency of the assembly as a whole.

The assembly is positioned with one end of the frame 10 located adjacent a tire building drum, generally designated 4, as seen in FIG. 1. For purposes of clarity, no particular details of the drum 4 are shown, other than its being mounted on a rotatable shaft 5.

The end of the frame 10 which is mounted adjacent the drum 2 is called, for purposes of this description, the servicing end of the assembly. This servicing end has mounted thereon a vertically aligned series of servicing devices which include a plurality of carcass stock trays 20, 22, 24, 26 and 28 and a tread stock tray 30. The carcass trays 22, 24, 26 and 28 as well as the tread stock tray 30 are pivotable about respective horizontal axes. During the building operation, tray 20 is preferably fixed in the frame 10. The servicing devices further include a series of fluid actuated piston-cylinder mechanisms 40 for the independent pivotal movement of trays 22, 24, 26 and 28 as well as a fluid actuator 45 for pivotal movement of the tread stock tray 30. The servicing device which includes the tread stock tray also is provided with a second fluid actuator 43 which functions to selectively extend and retract the tread stock tray 30. More of the structural details of the servicing devices according to the invention will appear hereinafter.

Each of the carcass stock trays, i.e. trays 20, 22, 24 26 and 28, is operatively associated with a rotatable shaft carried by the frame 10 for rotatably supporting a storage roll or shell of particular carcass stock, as for example, shaft 66 (FIG. 1b) which is to support a roll of stock for tray 26. Between each shaft and its associated tray are guide means, also carried by the frame 10, through which a continuous sheet of carcass stock, withdrawn from the storage roll, is threaded and ultimately is held by one of the carcass stock trays. More of the details of the means by which the different carcass stocks are stored and guided to the servicing devices will also appear hereinafter.

Generally, the tire builder performs the tire building steps while standing substantially in one position, i.e. adjacent the drum 4, on the side opposite the side of the drum nearest the servicer. He may independently control movement of the trays by means of a convenient control panel (not shown). Due to particular control circuitry involved with this control panel, safeguards are provided to assure a correct and efficient building operation. Details of this circuitry will be more fully described hereinafter.

(B) Servicing devices

Six servicing devices are shown mounted at the front or servicing end of the assembly as seen in FIG. 1, according to a preferred embodiment of the invention. Each of the servicing devices includes structure dapted to independently provide a particular tire component to the tire builder as needed. The vertical disposition of each servicing device relative to the remaining devices dictates the particular tire component it is to provide.

The first of these devices is basically just a tray, generally designated as 20, which extends outwardly from the end of the frame 10 toward the tire building drum. The sides of the tray 20 are defined by a pair of spaced parallel plates 21. The side plates 21 carry a plurality of transversely extending cylindrical rollers 23 mounted on mutually parallel axes perpendicular to the sides of the tray 20. The rollers collectively impart a substantially frictionless or low friction floor or supporting surfaces of tray 20. The side plates and rollers may be of any suitable material or design which might tend to enhance the desirable material low friction characteristics of the tray 20.

The tray 20 is mounted in cantilever fashion from the frame 10 and is specifically shown secured to a horizontal pivot shaft 50 mounted between two spaced, parallel vertical standards which form part of the main frame 10. One of these standards 12' is shown in FIG. 1 as a frontal off-set extension of vertical member 12. For purposes of this invention, the tray 20 is considered "fixed" to the frame 20 during a given tire building operation, but is adapted to be adjusted by means of an adjustment link 11. One end of the link 11 is provided with an adjustment slot 18 and is attached to member 12 of frame 10. The opposite end of the link 11 is suitably secured to one of the side plates 21 of the tray 20.

As mentioned, the tray 20 remains fixed in the frame 10 when used in conjunction with a particular tire building drum, but in order that the servicing assembly may be used with drums of different diameters, adjustment of the tray 20 to a new fixed position is possible by pivoting the tray about shaft 50 by means of readjustment of the link 11.

The tray 20 should extend from the end of the assembly in a manner such that a line along its extension direction will be substantially tangent to the outer surface of the drum 4 at some point on the "builder's side" of the drum, i.e. the side of the drum opposite the side adjacent the servicer.

Aligned above the aforementioned first servicing device are four pivotable servicing devices composed of trays 22, 24, 26 and 28, each of which is associated with a fluid operated piston-cylinder means 40. Each tray 22, 24, 26 and 28 is substantially identical in construction to the lowermost tray 20, (i.e. comprising spaced side plates connected by freely rotatable rollers). Each tray 22, 24, 26 and 28 is mounted to pivot at one end about a horizontal pivot shaft, each of which is designated as 52 in FIG. 1. The shafts are each mounted at their ends in a pair of spaced pillow blocks 53, carried by the vertical frame member 12'.

One side plate of each pivotable tray is provided with an opening through which each pivot shaft 52 passes and which terminates in an extension arm 54 (shown only with respect to tray 22 for purposes of clarity) to which is connected the end of a piston rod 42 in each piston-cylinder means 40.

It will thus be seen that when the piston rods, such as 42, of each means 40 are retracted, each tray 22, 24, 26 and 28 are positioned as shown in FIG. 1. When fluid is introduced into the cylinders to extend the piston members thereof, the trays are pivoted to an upwardly inclined position as also shown in the respective phantom outlines in FIG. 1.

The cylinders 40 are suitably secured to the frame by a suitable bracket arrangement indicated generally as 47 in FIG. 1. The particular dispositions of and types of mounting means for the cylinders are not critical to the present invention. Many types of arrangements are possible in order to achieve the function of pivoting each tray into and out of the positions illustrated in FIG. 1. The extension and retraction of the pistons of the means 40 are controlled by conventional solenoid valves energized by the tire builder through a circuit arrangement to be more fully described hereinafter.

The bracket arrangement 47 is adapted for vertical adjustment by means of a conventional adjusting screw and nut assembly generally indicated as 48 in FIG. 1. Adjustment of bracket 47 is necessary when and if a building drum of different diameter is used. As stated previously, tray 20 is adjustable relative to the particular drum diameter being serviced, and thus it follows that trays 22, 24, 26 and 28 must also be adjusted. It can been seen that movement of the bracket will cause repositioning of the cylinders secured thereto and ultimately change the positioning of each pivotable tray. Thus, movement of bracket downwardly will correspondingly raise each tray 22, 24, 26 and 28 upwardly, and vice-versa.

It should be stated here that trays 20, 22, 24, 26 and 28 are distinctive in that they each are disposed to carry the end portion of a continuous sheet of a particular type of carcass stock, which is withdrawn from a roll carried by the frame and guided to the trays by means as will hereinafter be more fully described. While the tray structures are shown as substantially identical in construction, it is understood that it may be necessary to vary the construction of one or several of the trays due to certain peculiar characteristics of the carcass stock which is presented to the builder. For example, it may be necessary to vary the widths or effective depths of certain trays. Such differences are contemplated within the scope of this invention, as being obvious structural parameters to be determined when considering the particular type of tire or tires being built.

The top servicing device which is to present to the builder the final required component, usually in the form of an extruded length of elastomeric material, comprises in essence a pivotable tray 30, operatively associated with a fluid operated actuator 45 functioning to effect such pivotal movement. Also, included as part of this device is a second fluid operated actuator 43 which effects rectilinear reciprocation of the tray 30.

For details of the top or tread stock servicing device, attention is directed particularly to FIGS. 1, 1a and 3. A horizontally disposed, rotatable power shaft 70 spans the upper portion of frame 10 and is mounted for rotation in a pair of pillow block bearing structures 75 supported by spaced longitudinal frame members 14. Disposed rearwardly of bearing structures 75 is another opposed pair of pillow block bearing structures 77 mounted on frame members 14. Each bearing structure 77 carries a rotatable stub shaft 72.

Keyed or otherwise secured to rotatable power shaft 70 is a power arm 71 and a pair of spaced tray operator arms 73. Keyed or otherwise secured to each stub shaft 72 is the end of one of a pair of identical idler arms 74.

Also mounted on frame 10 and spaced rearwardly of bearings structures 75 and 77 is a cylinder mount bracket 78 suitably secured to one of the spaced longitudinal frame members 14. One end of the aforementioned fluid actuator means 45 is attached to the bracket 78 by a clevis pin 79.

The fluid actuator 45 is a typical cylinder and piston type mechanism wherein fluid pressure operates within the cylinder to reciprocate the piston and its attached piston rod 44. The end of the piston rod 44 is secured to the free end of power arm 71 by means of a connecting pin 46.

The forward or free end of each tray operator arm 73 is connected to an end of a horizontally extending idler shaft 76 disposed beneath tray 30. The arms 73 are connected to idler shaft 76 such that the end portions will rotate about the idler shaft.

As mentioned above, one end of each idler arm 74 is secured to one of a pair of stub shafts 72. The opposite end of each idler arm 74 is connected to one of a pair of stub shafts 72' similar to shafts 72.

A pair of spaced parallel guide rods 35 are mounted adjacent tray 30, one on each side thereof. The rods 35 are fixedly supported by two pairs of spaced upright support members 37. One pair of spaced support members 37 are carried on idler shaft 76, while the second pair are carried by stub shafts 72'.

The length of tray 30 is defined by spaced parallel side plates 32. Attached to each side plate 32 is a pair of guide bearings 33. In FIGS. 1 and 3 only one guide 33 is shown on each side plate 32, it being understood that an additional guide is located directly opposite to each guide shown. The guides 33 are shown slidably connected with guide rods 35. The specific number and location of guides 33 is not critical and a greater or lesser number of guides 33 may be provided at different locations along side plates 32, as required.

On one side of tray 30, above one of the guide rods 35, a fluid actuator means 43 is mounted with one end secured to one of the rod supports 37 by means of a clevis pin 79' similar to pin 79 which mounts actuator 45. The actuator 43 is similar in construction to actuator 44 and its movable piston rod 48 is secured to a bracket 31 connected to a side plate 32.

On the underside of tray 30 attached to side plates 32 is a pair of gear racks 34. Racks 34 mesh with a pair of spur gears 36 rotatably mounted on idler shaft 76. By means of the guide rods 35 and bearings 33, and racks 34 and gears 36, substantially true linear reciprocation of tray 30 is assured.

From the preceding details, it can be seen that reciprocation of piston rod 44 of actuator 45 will swing the tread tray 30 between the position shown in FIG. 1 to the position shown in phantom outline and vice versa. Also, reciprocation of piston rod 48 of actuator 43 will slide tray 30 between the position as shown in FIG. 1 to the position indicated in phantom outline as 30' and vice versa.

The floor of tread tray 30 includes a forward area composed of freely rotatable, transversely disposed rollers 38 carried between side plates 32. The function and disposition of rollers 38 is similar to that featured in the carcass stock trays 20, 22, 24, 26 and 28 mounted beneath tread tray 30. In the preferred embodiment, rollers 38 are shown to be of larger diameter compared to the rollers of the carcass stock trays, since the support and reduced or low frictional requirements of tread stock is usually different from that of carcass stock sheet. However, other considerations may alter this preference such that rollers 38 may be the same size or even smaller than the carcass tray rolls.

The rearward portion of the floor of tray 30 is particularly shown to include a series of parallel longitudinally extending support bars 39. This portion of the floor can be solid if desired, however, the particular design shown is for purposes of providing an optional tread heating feature. The side plates 32 are shown provided with opposed pairs of opening 32' adapted to support an infra-red heating element (not shown) to be disposed beneath tray 30 and extending thereacross. The heating element is to keep one end of the tread stock warm while the carcass is being assembled. This heated end will thus facilitate the final stitching operation along the splice line of the tread stock after it is positioned on the building drum. Thus, the rearward portion of the floor is designed to afford relatively unobstructed heat flow to the tread stock from the optional heating element if used.

Normally, tread stock guide means are provided to maintain the tread in the center of the tray as it is pulled therefrom. Designs of these guides can vary from a very simple device to a quite sophisticated assembly. A pair of support means $G_1$ are positioned at the forward end of tray 30 to represent where such a guide means (not shown) can be located. The specific guide means selected for use with tray 30 may be one of the common types available in the industry. Alternatively, it may be desirable to omit completely a tread guide and allow centering of the tread to the skill of the builder.

(C) Carcass stock supply systems

As generally indicated above, each carcass stock tray is operatively associated with an independent stock storage and supply system carried by the frame 10. Servicers of the type herein described usually are adapted to store a distinctive carcass material in the form of a continuous sheet wound onto a storage drum or roll. The carcass sheet is usually wound on the drum coupled with a sheet of liner material so that adjacent layers of wound stock sheet will not be in direct contact and thereby prevent adhesion of the tacky layers.

In order to describe the carcass stock systems particular attention is directed to FIGS. 1, 1a, 1b and 2.

Five horizontally disposed, rotatable shafts 60, 62, 64, 66 and 68 are carried by frame 10 and adapted to support a storage roll or drum of distinctive carcass stock sheet for for trays 20, 22, 24, 26 and 28 respectively. The storage roll shafts are positioned at staggered locations along the frame so that the over-all machine remains a substantially compact structure.

Rotation of each of the storage roll shafts is controlled by a friction or drag brake structure, such as 61, which continuously maintains a drag force on each shaft. The braking force is such that it may be over-ridden by a predetermined pulling force applied to withdraw carcass sheet from the storage roll and will stop the roll when such pulling force is removed. The particular friction brake design is not considered critical to the instant invention and will therefore not be described in specific detail.

Each shaft is mounted in cantilever fashion in frame 10, such as shown in specific detail in FIG. 2 with respect to shaft 66. The shaft 66 rotates within any suitable bearing structure such as 63 and 65 mounted on suitable frame members 14 at one side of frame 10. The shaft 66 extends across the width of frame 10 and terminates at the opposite side thereof. Each shaft is similarly supported and adapted to receive a full roll of carcass stock at its free or unsupported end.

Between each shaft 60, 62, 64, 66 and 68 and its respective servicing tray 20, 22, 24, 26 and 28, means are provided to withdraw carcass stock from a storage roll and feed the stock onto a particular tray. These means each include basically similar structural elements, and to avoid unnecessary duplicity, a detailed description will be given with respect to the supply system associated with shaft 66 and tray 26, with brief references to the differences between systems, if any.

For purposes of the following details, tray 26 will be considered as that carcass stock tray operative to present to the builder the third carcass ply during the tire building sequence. The shaft 66 is to rotatably support a roll of carcass stock $S_3$ indicative of that which is to be applied as the third ply.

A rotatable shaft 86 is mounted in cantilever fashion in suitable bearings 81 located at one side of frame 10. Shaft 86 is structurally identical to shaft 66 and disposed parallel thereto. Shaft 86 is positively driven by a suitable reversible electric motor 116 through a conventional belt drive indicated generally as 83.

Mounted above shaft 86 and parallel thereto is a series of freely rotatable guide rollers 85, 87, 89 and 90 around which carcass stock sheet $S_3$ is threaded as shown when unwound from its storage roll on shaft 66 (see FIGS. 1a and 1b). The rollers, 85, 87, 89 and 90 are supported between a pair of spaced brackets 15 secured to selected structural members of frame 10. The first roller 85 supports and guides stock $S_3$ in its stored form, i.e. as a laminate of ply or carcass stock with its interwound layer of liner material. Forwardly of roller 85 the stock $S_3$ is separated from liner $L_3$, with the stock $S_3$ passing over roller 90 and the liner material $L_3$ passing over roller 89. The liner material $L_3$ reverses direction to pass over roller 87 and is wound onto a liner windup roll (not shown) rotatably supported by shaft 86 similar to the storage roll carried by the shaft 66. The carcass sheet separated from the protective liner, passes over roller 90 to form a festoon $F_3$ indicated in FIG. 1a. A festoon guard plate 17 isolates the festoon so as to prevent its tangling or contacting surrounding portions of the system.

From the festoon the stock $S_3$ passes through a centering device, indicated generally as 96, and is guided to an apron assembly $A_3$. The centering device 96 functions to position the stock centrally of the apron assembly and comprises two spaced guides which are laterally adjustable so as to center a variety of carcass stock widths. The forward section of the apron is provided with as many rollers 99 as needed to further aid in supporting and guiding the sheet onto the apron assembly. The particular construction of the apron assembly $A_3$ is not critical and can, for example, be a heavy paper endless belt movable over a series of freely rotatable support rollers, one of which is shown and designated 95 in FIG. 1a.

In the preferred embodiment only three apron assemblies are shown $A_2$, $A_3$, and $A_4$. The apron assemblies are used where the festoon portion of the carcass stock is located at some distance from its particular take-off tray. As seen from FIGS. 1 and 2a, aprons have not been required for the particular supply systems associated with trays 20 and 22.

Since the function of apron assemblies $A_2$, $A_3$ and $A_4$ is to convey carcass sheet from the festoon to its particular take-off tray, other equally suitable constructions than than that described are possible. For example, freely rotatable rollers similar to those which form the carcass stock tray floors may be used. Any other designs which would permit substantially frictionless conveyance of the stock from its festoon portion to a tray are possible as desirable alternatives for the apron assemblies described above.

At the end of apron assembly $A_3$ is a final guide roller 91 (FIG. 1) under which stock $S_3$ passes to reach the tray 26. The sheet $S_3$ extends along the floor of tray 26 defined by the aforementioned rollers and terminates at the end of tray 26 where it can be grasped by the tire builder.

As indicated above, the liner windup roll 86 is the only element in the supply system for tray 26 which is positively driven. Rotation of the various other support and guide rollers in the system is effected by frictional contact with the carcass stock as it moves thereover.

Windup of liner $L_3$ by rotating shaft 86 causes rotation of guide rollers 87 and 89 due to movement of the liner thereover. A chain and sprocket drive (not shown) connects roller 89 with roller 90, thereby effecting rotation of roller 90. It is preferred that the chain and sprocket drive is designed to provide that roller 90 rotate slightly rather than roller 89.

To compare similarities and differences between each of the five systems shown in the embodiments, it is noted that like numerals in all systems are intended to designate substantially similar structure as that designated in the supply system for tray 26.

As seen in FIGS. 1 and 1a fixed tray 20 is associated with storage roll shaft 60. Carcass stock S stored on shaft 60 is separated from its liner L to pass over roll to form a festoon. Liner L is wound by positive rotation of liner windup shaft 80 driven by another second reversible electric motor 116. Since the formation of the festoon F of stock S occurs closer to tray 20, there is no particular need for an apron assembly as required for trays 24, 26 and 28. The stock S passes through a centering device 96 and onto tray 20.

By inspection of FIGS. 1, 1a and 1b the paths of each stock S, $S_1$, $S_2$, $S_3$ and $S_4$ can be followed as indicated by the dot-dash outlines. Each system is provided with a first series of guide rollers such as 85, 87, 89 and 90 which function to separate the liners from the respective carcass stocks. Each stock is made to festoon prior to reaching its respective servicing tray or in the case of stocks $S_2$, $S_3$ and $S_4$, before reaching apron assembly $A_2$, $A_3$ and $A_4$ respectively.

A plurality of photo-switch controls PS–1, PS–2, PS–3, PS–4 and PS–5, one for each festoon, are mounted on the frame adjacent the lower portion of the festoons, and control motors 116 in response to changes in festoon lengths. These controls will be more fully described hereinafter.

(D) Controls

The servicing assembly of the present invention is provided with such controls that it may be readily and safely operated by a relatively unskilled builder with a minimum amount of care and attention. The components of the electrical circuitry such as relays, solenoids and related controls are conventional in character. The circuitry is depicted in FIGS. 4 and 4a as a block diagram with the various components represented in mere diagrammatic form. FIG. 4a is a continuation of the diagram of FIG. 4, therefore, for purposes of the following description, FIGS. 4 and 4a should be considered together.

The main electrical power input to the circuit is indicated at the top of FIG. 4 as a three phase line indicated by lines 1, 2 and 3 with the current crossing a conventional main circuit breaker. The polarity of the power may be changed if desired by a main switch movable to positions R and F to close the respective contacts indicated at those positions. This is so that the operator may reverse the direction of the motors 116 in case such reversal is needed. For purposes of this description, it is assumed the switch is in the F position. The three phase lines 1, 2 and 3 branch to the right and left as seen in FIG. 4 to supply current to each of the motors 116 through branch lines $B_1$, $B_2$ and $B_3$. To readily identify each motor with respect to its function in the servicer assembly, the motors are distinctively labeled $M_0$, $M_1$, $M_2$, $M_3$ and $M_4$. The motors $M_0$, $M_1$, $M_2$, $M_3$ and $M_4$ are those motors 116 which function to windup the stock liner by rotation of shafts 80, 82, 84, 86 and 88 respectively. In other words, motor $M_0$ drives shaft 80, motor $M_1$ drives shaft 82, etc. Current to each motor is controlled by one of the triple contact motor switches $MS_0$, $MS_1$, $MS_2$, $MS_3$, and $MS_4$. Each motor is also provided with a pair of conventional thermal responsive circuit breakers 105 as a precautionary control in case of overheating of the motors.

Current in lines 1 and 2 is also seen extending to a step-down transformer T to reduce the voltage in order to supply the appropriate current to the builder's control circuit, part of which is shown in FIG. 4 and the remainder being shown in FIG. 4a. The main power lines for the complete control circuit from the output of transformer T are represented by a pair of parallel vertical lines 100 indicated in both FIGS. 4 and 4a.

The several control elements for operation of the services are shown connected into the lines 100 by various horizontally disposed conductors between lines 100.

The several controls connected to lines 100 may be divided into two general groups for purposes of this description. The first group are those included in the diagram from line 110 in FIG. 4 through line 160 which includes timer 180 in FIG. 4a. This control group is for proper operation of the various pivotable servicing trays located at the servicing end of the assembly. The second control group relate to operation of the various liner windup motors $M_0$, $M_1$, $M_2$, $M_3$ and $M_4$ and is represented in the lower portion of FIG. 4a as the various controls included in lines 200 through 253. It should be noted that lines 100 are shown broken at points X. Because each motor 116 is controlled by an identical circuit, this portion of the block diagram shows controls for only two of the five motors involved, to avoid unnecessary duplication. It is therefore understood that the broken points X represent an omission of three additional motor control circuits identical to the two circuits which are shown.

As mentioned above, the fluid actuators 40 are each controlled by a conventional solenoid valve. The operation of tray 22 is controlled by the circuit exemplified in FIG. 4 by lines 110, 111 and 112. In the preferred mode of operation the tray 22 is normally down throughout the building sequence, i.e. in its servicing position as shown in FIG. 1. Thus, in normal operation, the tray 22 is pivoted to its non-servicing (upwardly inclined) position only when the threading of a new roll of stock onto fixed tray 20 becomes necessary. Tray 22, on such occasion, is pivoted upwardly to provide the necessary access to tray 20 which is located immediately beneath tray 22.

To operate tray 22, the builder has access to two contacts $B_1$ in line $112'_1$ in line 110. Contact $B_1$ is normally closed with energization of the solenoid valve $SV_1$ in line 112 dependent upon closing of a normally open relay contact $CR_1$. The contact $CR_1$ in line 112 will close upon energization of relay $R_1$ in line 110. The operator, by closing contact $B'_1$ in line 110 can thus raise tray 22 when threading of the stock onto fixed tray 20 is necessary. Contact $B'_1$, when closed, energizes relay $R_1$ in line 110 which closes contact $CR_1$ in line 112 to energize solenoid valve $SV_1$. Valve $SV_1$ operates the appropriate piston-cylinder mechanism 40 to raise tray 22 up and away from fixed tray 20. Contact $B'_1$ is provided with a spring return and opens line 110 immediately upon release of the operator. However, line 112 is, at that point, a holding circuit, in that contact $CR_1$ in line 112 remains closed, solenoid valve $SV_1$ remains energized and thus tray 22 remains pivoted in its upwardly inclined position. To break this holding circuit the operator opens the normally closed contact $B_1$ which opens relay contact $CR_1$ and de-energizes solenoid valve $SV_1$. The tray then pivots downwardly to its servicing position as shown in FIG. 1. Indicator light G in line 111 tells the operator that solenoid valve is energized.

As mentioned, tray 24, along with trays 26 and 28 are normally in a raised non-servicing position and are lowered sequentially when needed during the tire building opeartion. The piston-cylinder means 40 associated with trays 24, 26 and 28, are each controlled by a solenoid valve which when energized effects a downward pivot of the trays. Thus, the solenoid valves for each of the piston-cylinder means 40 associated with trays 24, 26 and 28, when energized, effects pivoting downwardly, while the valve $SV_1$, as described above, when energized, effects upward pivotal movement of tray 22.

As seen in FIG. 4, lines 120, 121 and 122 are used in connection with tray 24. Closing contact $B_2$ will energize relay $R_2$ in line 120, the indicator lamp G in line 121 and the solenoid $SV_2$ in line 122. The relay $R_2$ closes all relay contacts $CR_2$ in the entire circuit, i.e. in lines 122, 130, 157 and 160. It is to be noted that line 122 also contains a normally closed timer contact $IT_3$, the purpose of which will be more fully explained hereinafter. The contact $CR_2$ being closed sets up a holding circuit in line 122 thereby maintaining the solenoid valve $SV_2$ energized when the contact $B_2$ is released by the operator. Thus, tray 24 which pivots to its servicing position due to energization of valve $SV_2$, stays down due to the holding circuit in line 122.

Lines 130, 131 and 132 control movement of tray 26. Relay $R_3$, indicator light G in line 121 and solenoid valve $SV_3$ are energized by closing contact $B_3$. It should be noted that this energization is possible because relay contact $CR_2$ in line 130 has been closed by previous energization of relay $R_2$. In this way, it is impossible to pivot tray 26 using tray 24. Thus, the builder cannot depart from the prescribed building sequence. Relay $R_3$ closes all relay contacts $CR_3$, i.e. in lines 132 and 140. Relay contact $CR_3$ provides a holding circuit in line 132 to hold tray 26 down as similarly described in connection with tray 24. Line 132 also contains a normally closed timer contact $IT_4$, similar to contact $IT_3$ in line 112.

Closing of relay contact $CR_3$ by relay $R_3$ in line 140 then makes it possible for the operator to pivot tray 28 into position by closing contact $B_4$ (FIG. 4a). Relay $R_4$, light G in line 141 and solenoid $SV_4$ will be energized by relay $R_4$ effecting closing of the relay contacts $CR_4$ in lines 142 and 150. $CR_4$ in line 140 maintains energization of valve $SV_4$ after contact $B_4$ is released and therefore tray 26 remains down. Line 142 also contains a timer contact $IT_5$ which is closed.

The trays 22, 24, 26 and 28 being held down in their respective servicing positions, operation of tread tray 30 is then possible using lines 150, 152, 153, 155 and 156. The operator uses three contacts to operate tray 30, $B_5$ in line 150, $B_6$ in line 153 and $B_7$ in line 155.

The tray 30 while trays 20, 22, 24, 26 and 28 are used, is in an upward non-servicing position and is retracted. Closing contact $B_5$ will energize relay $R_5$ and solenoid valve $SV_5$ and turn on light G in line 151. Solenoid valve $SV_5$ functions to pivot tray 30 downwardly through actuator 45. Relay $R_5$ closes relay contacts $CR_5$ in line 152 to hold tray 30 down and in line 153 to allow the next operational step.

Once the tray is down, it is extended by closing contact $B_6$ which energizes relay $R_6$ and solenoid valve $SV_6$. Solenoid $SV_6$ operates actuator 43 causing tray 30 to extend as shown in phantom outline in FIG. 1. Relay $R_6$ closes contact $CR_6$ to effect a holding circuit in line 155.

After the tread stock is removed from the extended tray 30 and put on the drum, it is then necessary to return the trays to their respective positions in readiness for another tire building sequence. With all trays down and the tread tray extended as indicated by all the lights G being on, the operator then closes contact $B_7$ in line 156.

Relay $R_7$ is energized by the closing of contact $R_7$. Normally closed relay contact $CR_7$ in line 155 immediately opens and de-energization of solenoid $SV_6$ causes the tray 30 to retract. Relay contact $CR_7$ in line 157 closes to turn on light G in line 157.

A main lead line 160 into a timer 180 contains a relay contact $CR_2$ which had been previously closed by relay $R_2$ in line 120. The line 160 is provided with a branch line 161 within timer 180, which is shown partially outside the timer. Line 161 contains a second relay contact $CR_7$ and a biased switch 162. The switch 162 is shown generally in FIG. 3 positioned so as to close when contacted by one of the guide bearings 33 on tread tray 30. The switch 162 is closed when tread tray 30 is retracted. Thus, when the holding circuit in line 155 is broken by opening relay contact $CR_7$ upon energization of relay $R_7$, the switch 162 closes when the tray retracts by de-energization of solenoid valve $SV_6$. Closing of switch 162 completes the circuit for timer 180 and a timer motor (not shown) starts which opens timer contact $IT_6$, $IT_5$, $IT_4$ and $IT_3$ respectively at timed intervals. Opening of these timer contacts results in breaking the respective holding circuits which serve to maintain energization of the respective solenoid valves.

It can be seen that it is not necessary to run through the entire sequence just described in order that the return sequence may be started.

For example, if trays 24 and 26 are brought down by proper closing of contacts $B_2$ and $B_3$ by the operator, then relay contact $CR_2$ in line 160 has been closed by relay $R_2$ in line 110. Since switch 162 is closed when the tray 35 is in its non-servicing position, i.e. pivoted upwardly and retracted, the two trays 24 and 26 may be returned simply by closing contact $B_7$ to energize relay $R_7$ thereby closing relay contact $CR_7$ in line 161 to begin the timer sequence. The timer then runs its pre-set cycle to ultimately return the trays 24 and 26 as desired.

Once the timer 180 runs through the prescribed cycle to open timer contacts $IT_6$, $IT_5$, $IT_4$ and $IT_3$, it shuts off automatically and the timer contacts once again close in readiness for another building operation.

As stated above, two typical windup motor controls are shown in FIG. 4a, motor $MS_1$ being controlled in lines 200, 201, 202 and 203, and motor $MS_0$ being controlled by lines 250, 251, 252 and 253.

Typical operator controlled switches such as $B_8$ and $B_9$ are located within easy access as for example at various locations along the open side of frame 10 (see FIG. 1a for switch $B_8$ and FIG. 1 for switch $B_9$). Each switch has three settings, automatic (AUTO), off (OFF) and rewind (REWIND) as seen in FIG. 4a. The two control circuits shown are set in their automatic positions.

Line 202 contains a photo-switch light source 205 and line 203 contains a photo-switch control 207. Light from source 205 contacting control 207 will effect closing of photo-switch contact PS–1 in 200. This will energize motor relay $MR_1$ to close the triple contact switch $MS_1$ shown in the upper portion of FIG. 4. The length of the respective festoons formed by each stock prior to their reaching a tray at the servicing end of the assembly are adapted to fall between the light source and control, such as 205 and 207 in lines 202 and 203, respectively. The light source 205 shines on the festoon when it is a particular length. If, by withdrawal of stock, the festoon length reduces such that the light from source 205 contacts control 207 relay $MR_1$ will energize and motor $M_1$ will rotate shaft 82 to unwind more stock from storage roll $S_1$ and lengthen the festoon once again breaking the contact PS–1.

For threading a fresh roll or shell of carcass stock through the servicer it is necessary to move switch $B_8$ to the rewind position. When so moved the switch drops to make contact in line 201, and thereby photo-switch PS–1 in line 200 is by-passed. Relay $MR_1$ is directly energized in this situation and the motor $MR_1$ rotates shaft 82 to wind the stock for threading. It is noted that when the switch $B_8$ is in the off position, no contact is made with either line 200 or line 201.

The circuit represented in lines 250, 251, 252 and 253 control the motor $M_0$ for rotation of shaft 80. Here light source 255 and control 257 are in lines 252 and 253 respectively. Light from source 255, in the case of a shortening of the festooned portion of stock S, contacting control 257 will close photo-switch contact PS–5 in line 250 thereby energizing relay $MR_0$. Triple contact switch $MS_0$ will close to operator motor $M_0$. Here again, movement of switch $B_9$ to rewind position will serve to by-pass contact PS–5 and direction operation of motor $M_0$ is possible.

As mentioned, the broken portion of lines 100 at points X represent the omission of control circuity for use in operating motors $M_2$, $M_3$ and $M_4$ and are not shown since the particular circuits are exact duplicates of the two circuits just described.

It should be once again emphasized that the operation controls for the servicer have been shown in simplified diagrammatic form and it is understood that the various relays, contacts, solenoids, etc. may be repositioned within their respective circuits while not altering their particular functions.

(E) Operation

Several aspects of the operation have frequently appeared in the foregoing sectionalized description. A general discussion of the operation of the complete assembly should now serve to complete understanding of the invention.

The operation will be described in connection with the building of a four ply bias-type tire, it being understood and readily seen that the servicing assembly herein disclosed is adapted to build many types of tires independent of the number of plies or the particular angle of the cords in the plies.

For purposes of this discussion, it is assumed at the start that the servicer is completely empty. The operator begins by supplying the servicer with the various rolls of the type of stock to be used in building the desired tire.

A conventional four-ply bias-type tire is normally provided with an inner liner, usually a thin impervious rubber layer on the inside of the tire to prevent escape of air. The operator loads an appropriate roll of inner liner stock S onto shaft 60 at the open side of the servicer. The operator then threads the stock S over the appropriate rolls such as 85, 87, 89 and 90 thereby separating stock S from its liner material L. The stock S then forms festoon F as shown in FIG. 1 and the liner material L is started around an empty roll or shell carried on shaft 80. The operator using switch $B_9$ in the rewind position, starts the windup of liner L onto the roll carried on shaft 80. By frictional contact of liner L roll 89 rotates thereby rotating roll 90 through the chain drive heretofore described. Stock S is thus unwound from the supply roll until it is of sufficient length to be placed on tray 20 after forming festoon F. The operator then sets switch $B_9$ to auto position.

Stocks $S_1$, $S_2$, $S_3$ and $S_4$ are loaded in similar manner on shafts 62, 64, 66 and 68 respectively. The stocks are appropriately threaded through the various supply systems for ultimate positioning on the respective trays 22, 24, 26 and 28. For each threading operation, the operator controls the separate windup shafts by setting of the appropriate switches in the rewind position. At the conclusion of the threading of each stock through the machine, the building of the tire can proceed with tray 20 holding the end of inner liner stock S, tray 22 holding first ply stock $S_1$, tray 24 holding the second ply stock $S_2$, tray 26 holding the third ply stock $S_3$ and tray 28 holding the fourth ply stock $S_4$. The five carcass stocks, i.e. the inner liner and the four carcass plies are in position for placement on the drum.

The thead tray holds an extruded slab of elastomeric material which forms the outer tread or tread and sidewall portion of the tire. This piece is placed on the tray by the operator.

When the building operation begins, trays 24, 26, 28 and 30 are in their raised non-servicing position shown in the phantom outline. Also, the tray is fully retracted.

The operator pulls the end of the sheet of inner liner stock from tray 20 and places it on the outer surface of the drum 4. The drum 4 rotates clockwise to wrap the sheet around the periphery thereof, as it comes from the servicer. After sufficient inner liner stock has been laid on the drum, the operator tears the sheet at a point spaced from the end of tray 20. The excess portion of sheets S overhanging the end of tray 20 is then turned back over onto tray 20.

The operator is then ready for applying the first ply stock $S_1$ on the drum over the inner liner component. Stock $S_1$ is pulled from tray 22 and applied to drum 2 in the same manner as inner liner stock S. After tearing the sheet $S_1$ and turning the overhanging portion back onto tray 22, the operator is ready to apply the second ply from stock $S_2$ on tray 24.

The operator at this point resorts to the control panel panel (not shown) usually located within easy access. He presses the proper button represented at contact $B_1$ in FIG. 4. The tray 24 with stock $S_2$ thereupon drops to the position shown in FIG. 1. The required length of second ply sheet $S_2$ is then taken from tray 24. As stated previously, the tray 24 remains down due to the holding circuit established by closing of contact $B_1$.

The operator then proceeds to bring down third ply tray 26 by pressing contact $B_2$ on his control panel and apply an appropriate length of stock $S_3$.

The fourth ply tray 28 is brought down in similar fashion by closing contact $B_4$ and then fourth ply sheet applied to complete application of the carcass components to the building drum.

With all trays down as shown in FIG. 1, and the several carcass components applied, the operator is then ready to apply the outer elastomeric piece over the carcass. The slab of stock held by tray 30 is either the tread stock alone or the combined tread sidewall stock. In some building operations the sidewall portions are applied separately to the drum and the tread applied between the already applied sidewalls. In other words, the outer tire surface is applied in three pieces. In other operations the tread and sidewall portions are extruded as a single piece and applied in one step to the carcass of the drum. The tray 30 can be used in either type of operation. In either event, the slab of material held by tray 30 will be termed the tread stock, it being understood that the term applies to a slab used as tread only or as the combined sidewall and tread.

The builder operates the tread stock tray 30 by first pressing contact $B_5$ on the control panel. Actuator 45 bring the tray 30 down to overlie the carcass stock trays previously used. Then contact $B_6$ is closed which extends the tray outwardly, closer to the drum 4. The operator pulls the tread stock from tray 30 and applies it to the rotating building drum. The operator then places a new tread stock on tread tray 30 for the next building operation.

Contact $B_7$ is then closed which instantaneously begins retracting tread tray 30. When the tray completely retracts, switch 162 closes and the timer 180 begins its return cycle. The tread tray rises to its non-servicing position, followed by trays 28, 26 and 24, which raise to non-servicing positions at spaced time intervals.

It is understood that at selected times throughout the building operation, stitching operations are performed on the tire as the several components are applied to mutually adhere the various layers.

The assembled tire "blank" is then removed from the drum and prepared for its curing in a mold.

As indicated, when the various festoons associated with the carcass stock S, $S_1$, $S_2$, $S_3$ and $S_4$ are shortened to a point where the photo-switches associated with each are energized, the particular motor involved will start and rotate the liner windup shaft to unwind more stock from the stock supply rolls.

While the operation described related to building of a four ply tire of the bias-type it is understood that tires of a lesser number of plies may be built simply by taking stock only from a selected number of the five carcass trays provided by the assembly. Also, tires with a greater number of plies may be built applying the carcass in the manner described and returning the carcass trays for reuse before applying the tread stock.

The preceding description is understood to be directed to a preferred embodiment of the invention covered in the attached claims.

What is claimed is:

1. In an assembly for supplying uncured tire components to a tire building drum which comprises a frame and a selected number of verticaly spaced servicing devices mounted on said frame adjacent only one end thereof, the improvement wherein said servicing devices include
    (a) a fixed, carcass sheet tray extending from said end, said tray having a sheet supporting surface including means for providing low frictional resistance between said surface and a carcass sheet supported by and moved relative to said surface,
    (b) a plurality of supperposed, pivotable carcass sheet trays above said fixed tray and extending from said end, each of said trays having a sheet supporting surface including means for providing low frictional resistance between said surface and a carcass sheet supported by and moved relative to said surface,
    (c) a pivotable, extensible and retractable, tread stock tray overlying said carcass sheet trays, said tread stock tray having a sheet supporting surface including means for providing low frictional resistance between said surface and a tread stock supported by and moved relative to said surface,
    (d) a plurality of independently fluid actuatable means mounted on said frame, each of said means being exclusively, operatively associated with one of said pivotable trays defined in (b) and (c), to selectively pivot each tray through a predetermined arc defined by
        (1) a raised non-servicing position, and
        (2) a lowered servicing position, and
    (e) a second, independently fluid actuatable means operatively associated with said tread stock tray defined in (c) to selectively extend and retract said tray while in its lowered servicing position.

2. The assembly as defined in claim 1 wherein each of said carcass sheet trays is operatively associated with an independent carcass sheet supply system carried by said frame, each of said supply systems comprising
    (a) a rotatable shaft for supporting a roll of carcass stock sheet
    (b) means adjacent said shaft to intermittently withdraw carcass sheet from said roll, and
    (c) means to guide said withdrawn sheet onto a carcass sheet tray.

3. The assembly as defined in claim 2 wherein said means to guide said withdrawn sheet further includes
    (1) means to festoon said carcass sheet before reaching said carcass sheet tray.

4. The assembly as defined in claim 3 wherein a photo-switch is associated with each festoon adapted to control said means to intermittently withdraw carcass sheet in response to the length of said festoon.

5. An assembly for supplying uncured tire components to a tire building drum comprising a frame, a selected number of vertically spaced servicing devices mounted on said frame adjacent one end thereof, said servicing devices including
    (a) a fixed carcass sheet tray extending from said end,
    (b) a plurality of superposed, pivotable, carcass sheet trays above said fixed tray and extending from said end,
    (c) a pivotable, extensible tread stock tray overlying said carcass sheet trays,
    (d) an independently actuatable means associated with each pivotable tray defined in (b) and (c) to selectively pivot each tray through a predetermined arc defined by
        (1) a raised non-servicing position, and
        (2) a lowered servicing position,
    wherein each of said independently actuatable means is controlled by an independently energizable holding circuit having a control relay whereby said pivotable trays pivot from its raised non-servicing position to its lowered servicing position according to a prescribed sequence.

6. The assembly as defined in claim 5 further comprising independently actuatable means operatively associated with said tread stock tray to selectively extend and retract said tray while in its lowered servicing position.

7. The assembly as defined in claim 6 wherein said independently actuatable means to retract and extend said tread stock tray is controlled by an independently energizable electric circuit operable only when said tread stock tray is in its lowered servicing position.

8. The assembly as defined in claim 5, further comprising an independently energizable timer circuit interconnecting a selected number of said holding circuits and adapted upon energization to break said holding circuits according to a timed sequence whereby each of the pivotable trays controlled by said selected number of holding circuits will pivot from its lowered servicing position to its raised non-servicing position.

References Cited

UNITED STATES PATENTS

| | | | |
|---|---|---|---|
| 1,880,519 | 10/1932 | Stevens | 156—406X |
| 2,045,534 | 6/1936 | Stevens | 156—395X |
| 2,381,379 | 8/1945 | Stevens | 156—405X |
| 2,665,757 | 1/1954 | Stevens et al. | 156—405X |
| 3,017,312 | 1/1962 | Kraft | 156—395X |
| 3,038,524 | 6/1962 | Bosomworth | 156—405 |

BENJAMIN A. BORCHELT, Primary Examiner

S. C. BENTLEY, Assistant Examiner

U.S. Cl. X.R.

242—58